United States Patent [19]

Chlanda et al.

[11] Patent Number: 4,592,817

[45] Date of Patent: Jun. 3, 1986

[54] ELECTRODIALYTIC WATER SPLITTING PROCESS FOR GASEOUS PRODUCTS

[75] Inventors: Frederick P. Chlanda, Rockaway; Krishnamurthy N. Mani, Denville, both of N.J.

[73] Assignee: Allied Corporation, Morris Township, Morris County, N.J.

[21] Appl. No.: 676,609

[22] Filed: Dec. 3, 1984

[51] Int. Cl.$^4$ .............................................. B01D 13/02
[52] U.S. Cl. .................. 204/182.4; 204/301
[58] Field of Search .............................. 204/182.4, 301

[56] References Cited

U.S. PATENT DOCUMENTS

| | | | |
|---|---|---|---|
| 3,515,513 | 2/1969 | Parsi | 204/180 P |
| 4,107,015 | 8/1978 | Chlanda et al. | 204/180 |
| 4,219,396 | 8/1980 | Gancy et al. | 204/180 P |
| 4,238,305 | 12/1980 | Gancy et al. | 204/180 P |

OTHER PUBLICATIONS

Patent Memorandum, 01-78, entitled "Electrochemical Sulfur Oxide Pollution Control Process for Sulfuric Acid Plants", by T. J. Jenczewski and W. H. Skinner, Allied Chemical Corporation, 1978.

*Primary Examiner*—John F. Niebling
*Assistant Examiner*—B. J. Boggs, Jr.
*Attorney, Agent, or Firm*—Gus T. Hampilos; Gerhard H. Fuchs

[57] ABSTRACT

The present invention provides an improved electrodialytic water splitting process that may be operated in two- or three-compartment cells to recover valuable metal or ammonium values from materials comprising a salt of a first acid while avoiding formation of gas bubbles in the two- or three-compartment electrodialytic water splitting cells. The process comprises contacting a material comprising a salt of a first acid e.g. $Na_2SO_3$, $Na_2CO_3/NaHCO_3$, wherein the first acid is capable of generating a gas upon acidification of the salt of the first acid with a hydrogen ion-enriched aqueous solution comprising a second acid, e.g. $Na_2SO_4/H_2SO_4$ which is generated and withdrawn from a two- or three-compartment electrodialytic water splitter. The gas generated e.g. $CO_2$, $SO_2$ is released external to the water splitter where it can be easily removed by conventional techniques such as application of vacuum. The aqueous hydrogen ion-enriched solution selected must be capable of transferring hydrogen ions to the salt of the first acid in an amount sufficient to produce the first acid and a salt of the second acid; the second acid is then regenerated from the salt of the second acid.

20 Claims, 4 Drawing Figures

ELECTRODIALYTIC WATER SPLITTING PROCESS FOR GASEOUS PRODUCTS

This application is a continuation of application Ser. No. 490,943 filed May 2, 1983 now abandoned.

BACKGROUND OF THE INVENTION

This invention relates to an improved electrodialytic water splitting process for materials that evolve gases of low aqueous solubility upon contact of the materials with aqueous acid. More particularly, this invention relates to the improved operation of two- and three-compartment electrodialytic water splitters by acidification, external to said water splitters, of a material comprising a salt of a first acid, capable of generating a gas upon acidification, with a hydrogen ion-enriched aqueous solution comprising a second acid generated and withdrawn from said water splitters.

Electrodialytic water splitting in bipolar membrane containing cells is a well known method of introducing hydrogen ions into one solution acidification while simultaneously introducing hydroxide ions into another solution (basification). Thus, electrodialytic water splitting of aqueous salts (e.g., NaCl) produces solutions of aqueous acid (e.g., HCl) and of aqueous base (e.g., NaOH). See, for example, U.S. Pat. No. 2,829,095 (Oda et al.) which discloses electrodialytic water splitting of aqueous salts such as sodium chloride and sodium acetate produce dilute aqueous acid and base solutions.

U.S. Pat. Nos. 4,082,835 and 4,107,015 (Chlanda et al.) disclose electrodialytic water splitting processes to recover $SO_2$ from dilute gas streams containing same comprising the steps of (1) solution scrubbing said gas streams with an alkaline aqueous solution containing NaOH, $Na_2SO_3$ and/or $Na_2SO_4$ to produce an aqueous $SO_2$-containing salt solution comprising aqueous $Na_2SO_3$ and $NaHSO_3$ (2) regenerating alkaline aqueous scrubbing solution and producing sulfurous acid solution in a two-compartment electrodialytic water splitter; and (3) liberating $SO_2$ gas. These processes suffer from a number of inherent disadvantages. For example, although the processes therefore may be effected in a two-compartment water-splitter, the composition of the solutions fed to both compartments is identical. Furthermore, the basic product solutions are mixtures, e.g., aqueous NaOH, $Na_2SO_3$, and $Na_2SO_4$ and, as such, cannot normally be used in other processes wherein relatively pure products are required. Moreover, the electrodialytic water splitters are operated under superatmospheric pressure to insure that aqueous sulfurous acid generated in the acid compartments of the water splitters does not evolve gaseous in order to increase $SO_2$ the service lifetime of the water splitters beyond about four months. However, operating the water splitter under superatmospheric pressure results in higher cell voltage.

U.S. Pat. No. 4,238,305 (Gancy et al.) discloses a two-compartment electrodialytic water splitting process for converting relatively dilute aqueous solutions of sodium carbonate, sodium bicarbonate, trona or mixtures thereof into aqueous sodium hydroxide and carbon dioxide gas. However, the concentration of sodium carbonate in the solution which is fed to the acid compartment of the electrodialytic water splitter must be no more than 12 weight percent to prevent the precipitation of $NaHCO_3$ from the solution. Furthermore, $H_2CO_3$ is produced in the acid compartment and $CO_2$ gas evolves therefrom. The sparingly soluble $CO_2$ gas is detrimental to cell performance.

Several inorganic salts liberate gaseous products when they are acidified. These inorganic salts include sulfites ($SO_3^=$) and bisulfites, ($HSO_3^-$), carbonates ($CO_3^=$) and bicarbonates, ($HCO_3^-$) sulfides ($S^=$), hydrosulfides ($HS^-$) and nitrites ($NO_2^-$). For example:

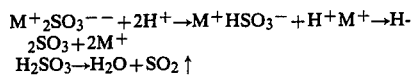

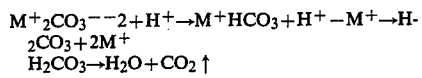

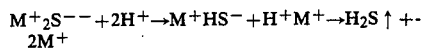

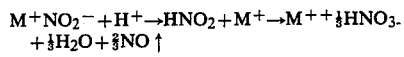

Huge quantities of waste streams contain carbonates and bicarbonates (for example, trona process liquors) and sulfite, bisulfite (for example, alkaline $SO_2$ scrubbing solution), and these streams are amendable to recovering of valuable metal ion values, e.g., $Na^+$, via electrodialytic water splitting. However, prior art electrodialytic water splitting processes disclose no method which allows recovery of these valuable metal ion values without the deleterious formation of bubbles of sparingly soluble gas in the acid compartments of the electrodialytic water splitters.

SUMMARY OF THE INVENTION

We provided a process which comprises: contacting a material comprising a salt of a first acid with a hydrogen ion-enriched aqueous solution comprising a second acid to produce produce a solution comprising the first acid and a salt of the second acid, and being substantially free of the salt of the first acid;

feeding at least a portion of the product solution to an electrodialytic water splitter and generating the hydrogen ion-enriched aqueous solution comprising the second acid therein; withdrawing the hydrogen ion-enriched aqueous solution comprising the second acid from the electrodialytic water splitter and supplying at least a portion thereof for contact with material comprising salt of the first acid.

In accordance with a preferred embodiment, the process comprises the steps of:

(a) contacting a material comprising a salt of a first acid, with an aqueous hydrogen ion-enriched solution comprising a second acid, to produce a product solution comprising the first acid and the salt of the second acid, and being substantially free of the salt of the first acid;

(b) introducing the product solution between a face of a cation membrane and a cation face of a bipolar membrane which define an acid compartment of an electrodialytic water splitter comprised of alternating cation and bipolar membranes being positioned between two electrodes;

(c) introducing a liquid comprising water between a face of a cation membrane and an anion face of a bipolar membrane which define a base compartment;

(d) passing direct current through said electrodialytic water splitter thereby adding hydrogen ions into said aqueous solution comprising the salt of the second acid in the acid compartment, adding hydroxide ions into the liquid comprising water in the base compartment and transferring cations from the aqueous solution comprising a salt of the second acid to the liquid comprising water;
(e) withdrawing an aqueous hydrogen ion-enriched solution comprising the second acid from the acid compartment;
(f) withdrawing an aqueous solution comprising base from the base compartment; and
(g) forwarding at least a portion of the aqueous hydrogen ion-enriched solution comprising the second acid withdrawn from the acid compartment for contact with salt of the first acid.

In accordance with another preferred embodiment, the process comprises the steps of:
(a) contacting a material comprising a salt of a first acid, with an aqueous hydrogen ion-enriched solution comprising a second acid to produce a product solution comprising the first acid, substantially free of the salt of the first acid, and a salt of the second acid;
(b) introducing at least a portion of the product solution between a face of a cation membrane and a face of an anion membrane which define a salt compartment of a three-compartment electrodialytic water splitter comprised of alternating cation, bipolar and anion membranes, said membranes being positioned between two electrodes;
(c) introducing a liquid comprising water between a face of a cation membrane and an anion face of a bipolar membrane which define a base compartment;
(d) introducing a liquid comprising water between a face of an anion membrane and a cation face of a bipolar membrane which define an acid compartment;
(e) passing direct current through said electrodialytic water splitter thereby adding hydrogen ions into the liquid comprising water in the acid compartment, adding hydroxide ions into the liquid comprising water in the base compartment, transferring anions from the aqueous solution comprising the salt of the second acid in the salt compartment to the liquids comprising water in the acid compartment, and transferring cations from the aqueous solution comprising the salt of the second acid in the salt compartment to the liquid comprising water in the base compartment;
(f) withdrawing an aqueous hydrogen ion-enriched solution comprising the second acid from the acid compartment;
(g) forwarding at least a portion of the aqueous hydrogen ion-enriched solution comprising the second acid withdrawn from the acid compartment for contact with salt of the first acid
(h) withdrawing an aqueous solution comprising base from the base compartment; and
(i) withdrwing an aqueous solution depleted in the salt of the second acid from the salt compartment.

DETAILED DESCRIPTION OF THE INVENTION

Figure 1:
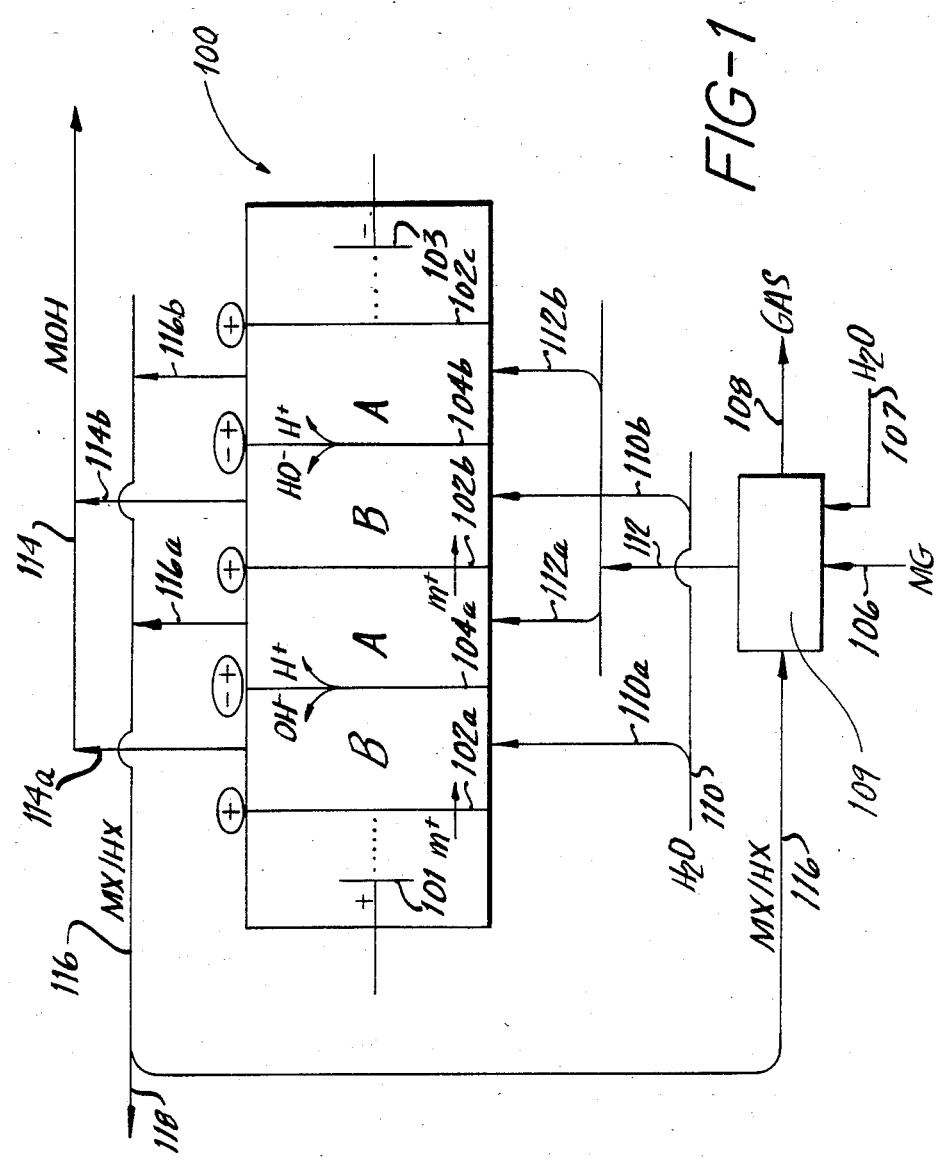
FIG. 1 illustrates schematically the process of the present invention operated in a two-compartment water splitter.

The present invention provides an improved electrodialytic water splitting process that may be operated in two- or three-compartment cells to recover valuable metal or ammonium values from materials comprising a salt of a first acid while avoiding formation of gas bubbles in the two- or three-compartment electrodialytic water splitting cells. The process consists of generating a hydrogen ion-enriched aqueous solution comprising a second acid in a two- or three-compartment electrodialytic water splitter and then using the aqueous solution to acidify the material comprising the salt of the first acid thereby, releasing gas external to the electrodialytic water splitting cell where it can be easily removed by conventional techniques (e.g., using a vacuum) and regenerating the second acid from a salt of the second acid generated in the acidification step. By employing our process it was possible to recover sodium values from an aqueous solution of sodium hydrogen sulfite (recovered from alkaline scrubbing of an $SO_2$ containing-gas) in a two-compartment water splitter which was operated for six months without increasing the voltage or causing leakage of the process solution through the membranes and gaskets. By operating in accordance with the present invention, sodium values in the form of sodium hydroxide may be recovered from aqueous sodium carbonate streams containing concentrations of sodium carbonate in excess of 12 weight percent, the concentration limit taught in prior art U.S. Pat. No. 4,238,305 (Gancy et al.). Furthermore, by providing for the liberation of gases such as carbon dioxide and sulfur dioxide externally of the two- or three-compartment electrodialytic water splitter cell, the following advantages are obtained: (1) cell construction is simplified and standardized and the application of back pressure on the electrodialytic water splitting cell is not necessary; (2) the bipolar membrane efficiency is improved compared to electrodialytic processes operated with internal acidification under similar conditions (formation of weakly ionized acids, e.g., $H_2SO_3$ and $H_2CO_3$ is avoided in the acid compartments, and diffusion of dissolved gas, e.g., $SO_2$ or $CO_2$ through the bipolar membrane into the base compartments is substantially eliminated, thereby increasing the overall base purity and production efficiency); (3) the average cell voltage is lower compared to an electrodialytic process operated with internal acidification under similar conditions because the formation of non-conductive bubbles of gas (e.g., $CO_2$ or $SO_2$ is substantially eliminated; and, (4) the service lifetime of the bipolar membranes and gaskets is significantly extended by operating the system to produce base while avoiding the in situ evolution of gases such as $CO_2$ or $SO_2$. These and other advantages will be more evident in view of the detailed description which follows.

The three-compartment water splitter used in the our invention incorporates a plurality of cation, bipolar and anion membranes arranged in an alternating fashion to define alternating base, acid and salt compartments that constitute at least one unit cell, the unit cell(s) being positioned between two electrodes to define an electrodialytic stack.

The two-compartment water splitter incorporates a plurality of cation and bipolar ion exchange membranes arranged in an alternating fashion to define alternating acid and base compartments that constitute at least one unit cell, the unit cell(s) being positioned between two electrodes to define an electrodialysis stack. The construction of electrodialysis stacks is well known and, for example, units are available commercially from Asahi Glass Co., 1-2, Marunochi 2-chome, Chiyoda-ku, Tokyo, Japan, from Ionics, Inc., Watertown, Mass. and from other commercial sources. In general, stacks which are suitable for electrolyte concentrate such as the Asahi Model CU-IV, may be used for the water splitter; however, the membrane used therein must be of a kind adaptable to water splitting. More particularly, the two-compartment water splitter used in the process of the present invention may be any of the devices described in U.S. Pat. No. 4,082,835 to Chlanda et al. (1979) for electrodialytic water splitting of sodium bisulfite and similar salts.

The two- and three-compartment water splitters employ suitable bipolar membranes, that can be of the type described, for example, in U.S. Pat. No. 2,829,095 to Oda et al. (which has reference to water splitting generally) in U.S. Pat. No. 4,024,043 (single film bipolar membrane), in U.S. Pat. No. 4,116,889 (cast bipolar membrane) or any other type which effectively converts water into hydrogen and hydroxyl ions.

The cation membranes useful in the process of the present invention may be weakly acidic or strongly acidic cation permselective membranes. Particularly useful cation membranes are Dupont's Nafion ® acidic fluorocarbon membranes, especially Nafion ® 110, 901 and 324; but other commercially available cation membrane may be used.

Among the anion membranes found useful in our invention and which also to provide an enhancement in the current efficiency as the temperature of the feed solution is raised above about 40° C., preferably above about 45° C., are commercially available weakly basic or strong basic membranes such as are available from Ionics Inc., Watertown, Mass. (sold as Ionics 204-UZL-386), from Asahi Chemical Industry Corp. or from Asahi Glass Co., (AMV anion membranes) or from Tokyama Soda.

The operating parameters of the two-compartment water splitter are similar to those described in U.S. Pat. Nos. 4,082,835 and 4,107,015, with modifications in the feed solution compositions s described hereinafter.

The operating temperature of the three-compartment water splitter may be any temperature compatible with the membranes and above the melting point of the solutions, and is preferably in the range of about 20° to about 60° C., and most preferably is at least about 40° C. Other operating parameters of the three-compartment water splitter are described hereinafter.

Direct current is passed through the two- or three-compartment water splitter in conventional fashion. The voltage is indicated by design and performance characteristics readily apparent to the skilled artist and-/or determined by routine experimentation. Some specific operating currents and voltages are presented in the examples described hereinbelow.

The salt of the first acid is selected from the group consisting of a salt of at least one member of Group Ia, IIa metals and $NH_4^+$ and at least one member of $HCO_3^-$, $CO_3^{--}$, $HS^-$, $S^{--}$, $NO_2^-$, $HSO_3^-$ and $SO_3^{--}$. Group Ia salts, especially $Na^+$ and $K^+$, and $NH_4^+$ salts of the first acid are preferred. The material comprising the salt of the first acid may be a solid (e.g., an ore, an aqueous solution, or) a slurry produced, for example, during treatment of bicarbonate containing ores such as calcined or uncalcined trona (sodium sesquicarbonate), nahcolite (sodium bicarbonate) or wegsheiderite ($Na_2CO_3.3NaHCO_3$). Some specific examples of useful materials comprising a salt of the first acid are solids recovered from dry scrubbing a $SO_2$-containing gas with a basic sodium-containing material, solids recovered from spraydry absorption of a $SO_2$-containing gas with a basic sodium-containing material; ore containing mixtures of $NaHCO_3$ and/or $Na_2CO_3$; and an aqueous solution recovered from wet scrubbing of a $SO_2$-containing gas with a basic sodium-containing material.

The second acids found useful in the process of the present invention include any acid having a water solubility of at least about 1 g/100 mL of $H_2O$ at 25° C. and being capable of transferring aqueous hydrogen ions to the salt of the first acid in an amount sufficient to produce a product solution substantially free of the salt of the first acid in comprising the first acid and a salt of the second acid. Among the second acids found useful in the process of the present invention are acids selected from the group consisting of $H_2SO_4$, $HSO_4^-$, $H_3PO_4$, $H_2PO_4^-$, $HPO_4^{--}$, HCl, $H_2F_2$, $HF_2^-$, $HO_2CCH--CHCO_2H$, $HO_2CH--CHCO_2^-$, $(CO_2H)_2$, $(CO_2^-)CO_2H$, $CH_2(CO_2H)_2$, $HOC(CH_2CO_2H)_2CO_2H$, $HOC(CH_2CO_2H)_2CO_2^-$, $HOC(CH_2CO_2H)(CH_2CO_2^-)(CO_2^-)$, $(HOCHCO_2H)_2$, $HO_2CCH(OH)CO_2^-$, and $HO_2CR$ wherein R is H, $CH_3$, $C_2H_5$, $CCl_2H$, $CCl_3$, $CH(OH)CH_3$, $CF_2H$ or $CF_3$.

Preferred second acids include $H_2SO_4$, $HSO_4^-$, HCl, $H_3PO_4$, $H_2PO_4^-$, $HPO_4^{--}$, $CH_3CO_2H$ (acetic), $HOC(CH_2CO_2H)_2CO_2H$ ($H_3$ Citrate), $HOC(CH_2CO_2H)_2CO_2^-$, ($H_2$ Citrate$^-$), $HOC(CH_2CO_2H)(CH_2CO_2^-)$, (H Citrate$^{--}$), cis—$HO_2CCH=CHCO_2H$, ($H_2$ maleate), and cis—$HO_2CCH--CHCO_2^-$ (H maleate$^-$).

The most preferable second groups are listed as follows:
(a) $H_2SO_4/HSO_4^-/SO_4^{--}$;
(b) $H_3PO_4/H_2PO_4^-/HPO_4^{--}$;
(c) $HO_2CCH_3/^-O_2CCH_3$;
(d) $H_3$ Citrate/$H_2$ Citrate$^-$/H Citrate$^=$/Citrate$^\equiv$; and
(e) $H_2$ maleate/H maleate$^-$/maleate$^=$.

Hydrogen ion-enriched aqueous solutions or mixtures thereof of the following strong acid salts may also be useful in the process of the present invention provided high concentration, e.g., about 15 weight percent of salt and relatively low degrees of acidity e.g., about 5 weight percent acid are employed, for example, and about 0.2 to about 2 weight percent HCl/about 15 to about 25 weight percent $Cl^-$/about 0.5 to 7.5 weight percent $H_2F_2$/about 15 to about 30 weight percent $F^-$(KF).

The contacting of the material comprising the salt of the first acid with the hydrogen ion-enriched aqueous solution of the second acid is conducted in a reaction zone external to the two- or three-compartment water splitter under any conditions of time, temperature and pressure sufficient to remove substantially all, i.e., at least about 90-95%, of the gas generated from the acidification of the salt of the first acid. Normally atmospheric or subatmospheric pressures and temperatures in the range of about 25°-70° C., especially about 35°–55° C., which temperatures are compatible with operation of the water splitters, are used.

Figure 2:
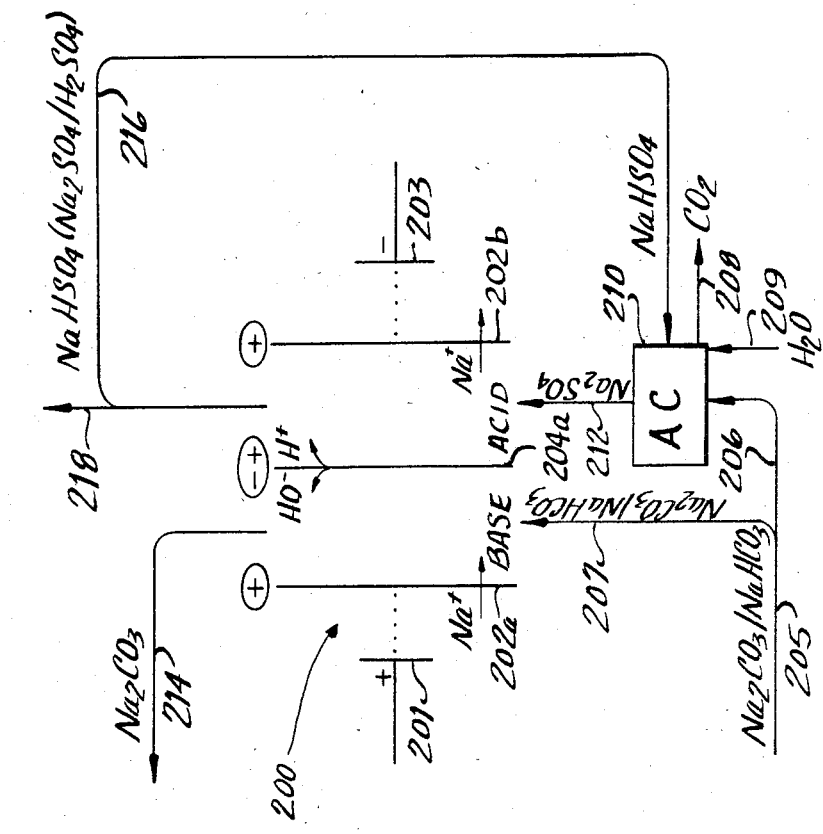
FIG. 2 illustrates schematically the ion transfer in a preferred embodiment of the process of the present invention operated in a two-compartment electrodialytic water splitter.

Exemplary of the operation of our process, one may convert an aqueous stream of $NaHCO_3$ and $Na_2CO_3$ into $Na_2SO_4$ and $CO_2$ according to the following reaction (occurring in the acidifier AC) schematically illustrated in FIG. 2:

$$Na_2CO_3 + NaHCO_3 + 3NaHSO_4 \rightarrow 3Na_2SO_4 + 2CO_2\uparrow + 2H_2O$$

The sulfate product is fed to the ACID compartment and $Na_2CO_3/NaHCO_3$ is fed to the base compartment.

The product withdrawn from the ACID compartment is $H_2SO_4/Na_2SO_4$, and the product withdrawn from the BASE compartment is $Na_2CO_3$. As is readily apparent the $CO_2$ is formed in and removed from the acidifier AC rather than being formed in the acid compartment of the two-compartment water splitter illustrated in FIG. 2. The advantages of this external acidification step have been previously discussed.

An acid of relatively low acidity (small ionization constants) such as acetic acid ($Ka = 1.6 \times 10^{-5}$) may be used as the second acid to convert a stream of NaHS to $H_2S$ and $Ha_2S$ according to the following reaction (occurring in acidifier 109) schematically illustrated in FIG. 1:

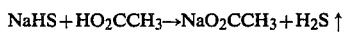

To illustrate the overall process, the feed to the ACID compartment would be: $NaO_2CCH_3$, the feed to the BASE compartment would be: NaHS, and products produced in and withdrawn and·base from the ACID compartments respectively would be: $NaO_2CCH_3/HO_2CCH_3$ and $Na_2S$.

The choice of the second acid to be used may be made on the basis of availability as well as compatibility with the present invention. As noted heretofore, the important chemical consideration for choosing the second acid is that the second acid should ionize in water to produce hydrogen ions in an amount sufficient to liberate the gas from the salt of the first acid. Obviously, a relatively weak acid such as acetic acid would not be very suitable for liberating a gas such as $SO_2$ from an aqueous solution of a relatively stronger acid such as sulfurous acid. However acetic acid may be used to liberate $SO_2$, from, for example, $Na_2SO_3$ provided the acidification reaction zone is maintained at subatmospheric pressure.

The choice of the second acid will affect the current efficiency and potential drop of the water splitter to a certain degree ratio of the. The of the cation of the first acid salt (e.g., $Na^+$) to $H^+$ in the acid compartment will affect the current efficiency of the electrodialytic water splitter for due to the competitive migration of $H^+$ to the base compartment. Weakly ionized acids will tend to give higher current efficiency for any given level of acidity. Weakly ionized acids will, however, lead to higher potential drops at high acid conversions due to the paucity of ions in the acid compartment to conduct the current. Therefore, dibasic or polybasic acids are preferred because they may be converted to high degrees and still maintain high conductivity. To illustrate this feature, note the following reactions:

$$NaO_2CCH_3 + H^+ \rightarrow Na^+ \rightarrow HO_2CCH_3 \quad (1)$$

$$Na_3\ Citrate + 2H^+ \rightarrow 2Na^+ \rightarrow NaH_2\ Citrate \quad (2)$$

For equal molar concentrations, twice as much acidity $H^+$ has been introduced into the citrate system as has been introduced into the acetate system. However, the conductivity of the acidified citrate system will be much higher than the conductivity of the acidified acetate system because the citrate system still contains a considerable concentration of $Na^+$ and citrate ions to carry the current. Thus when weakly ionized acids, such as acetic acid are employed as the second acid, higher conductivity may be maintained in the acid compartments by adding the salt of a strong acid, e.g., $Na_2SO_4$, to the second acid.

FIG. 1 illustrates the basic concepts of our invention as practiced in a two-compartment electrodialytic water splitter. The water splitter 100 comprises alternating cation membranes, 102a, 102b, 102c and bipolar membranes, 104a, 104b arranged to define alternating base compartments B and acid compartments A positioned between an anode 101 and a cathode 103. A salt MG is added as a solid, an aqueous slurry or and aqueous solution via line 106 to a reactor No. 109 (of any convenient design) wherein the salt MG reacts with an acid, HX, or a mixture of salt and acid, MX/HX, fed to the reactor 109 via a line 116 to liberate a gas G and to form a salt MX. The gas may be vented, or recovered by absorption, condensation, compression or other methods known in the art. The gas recovery may enhanced to insure a lower concentration of gas in the feed to the water splitter 100 by employing a vacuum, heating, in combination with the reactor, heating the contents of the reactor, or passing air through the contents in the reactor 109. The solution of salt MX is feed via lines 112, 112a and 112b to the the acid compartments A defined by the cation faces of bipolar membranes 104a and 104b and cation exchange membranes 102b and 102c. The solution may also include salt acid produced in the acid compartment A which has been removed and fed to a recirculation tank (not shown) which resupplies to the salt feed lines (112,112a, and/or 112b) the acid the water splitter 100. The salt solution produced in the reactor 109 may also be treated by techniques such as pH adjustment, and such as filtration or ion exchange to remove impurities and divalent cation such as calcium which may interfere with the operation of water splitter 100. In the water splitter 100, hydrogen ions are introduced into the acid compartments A via bipolar membranes 114a and 104b and salt cations $M^+$ migrate toward the cathode 103 by passing through cation membranes 102a, 102b and 102c to adjacent base compartments B. Some hydrogen ions will also migrate through cation membranes 102a, 102b and 102c to the base compartments B thereby forming water and causing a loss of efficiency for production in acid and base. The exact ratio of $M^+$ to $H^+$ migrating to the base compartments will depend on the ratio of $M^+X^-$ in the product solution in acid compartment A and the strength ionization potential of the acid HX. For example, if MX is NaCl then the overall efficiency will drop rapidly as HCl is formed in the acid compartments since HCl is a strong (highly ionized) acid. Thus, to practice the present invention with NaCl, the output from the water splitter(s) will consist mainly of salt (NaCl) with a lower concentration of acid (HCl). On the other hand, if the salt is sodium acetate (the salt of acetic acid, a weakly ionized acid) the output of the acid compartment A may consist of a relatively high concentration of acetic acid and a relatively low concentration of sodium acetate.

A portion of the product from the acid compartments A may be returned directly via lines 116 to the reactor 109 and the remainder may be feed via line 118 to another water splitter (not shown) for further acidification (staging). The liquid feed to the base compartments B via lines 110, 110a and 110b may be water, a base solution from another water splitter (not shown), a solution of soluble salt or a relatively acidic stream to be basified. In the water splitter 100, salt cations M$^+$ migrate from the acid compartments A through cation membranes 102a, 102b and 102c into the base compartments B and combine therein with hydroxide ions from the anion faces of bipolar membranes 104a and 104b to produce base. The product from the base compartments removed via lines 114a and 114b and supplied to line 114 may be used as is, concentrated by evaporation (not shown), or used as the feed to the base compartments of a second water splitter (staging, not shown).

FIG. 2 illustrates a preferred embodiment of the present invention as it could be used for converting trona into $Na_2CO_3$ solution and $CO_2$. In the process illustrated in FIG. 2, a sodium carbonate/bicarbonate mixture is dissolved to form a solution and at least a portion of the same is fed via lines 205 and 207 to the base compartment B of a two-compartment water splitter 200 which is analogous in design and operation to the water splitter described in FIG. 1. In the water splitter 200, the $NaHCO_3$ in the base compartment B is converted into $Na_2CO_3$ by reaction with the hydroxide ions formed at the anion face of bipolar membrane 204a. Usually, it is desirable to obtain a nearly saturated $Na_2CO_3$ solution so that a minimum amount of water need be evaporated to recover soda ash (anhydrous sodium carbonate). Thus, a portion of the base product stream in line 214 (containing reduced amounts of sodium bicarbonate may be recycled (not shown) to dissolve more $Na_2CO_3/NaHCO_3$ so as to obtain the highest concentration of $Na_2CO_3/$ possible. The remainder of the $Na_2CO_3/NaHCO_3$ solution in line 205 is added via line 206 to reactor (acidifier) 210 wherein the $Na_2CO_3/NaHCO_3$ reacts with an aqueous solution of $Na_2SO_4/H_2SO_4$ generated in acid compartments A of the water splitter (200 removed via line supplied to the acidifier by line 218 and 216). A wide range of concentration of the $Na_2SO_4/H_2SO_4$ is possible in the stream in line 216. Generally, it is advantageous to have less than about 1 mole of sulfuric acid per mole of sodium sulfate. Sodium sulfate concentrations of about 5 to about 35% (by weight sodium sulfate) and sulfuric acid concentrations of about 1 to about 15% (by weight) are preferred. In the reactor 210, the carbonate and bicarbonate salts react with $H_2SO_4$ to form $CO_2$ gas vented or recovered from reactor 210 via line 208 (and $Na_2SO_4$) removed from 210 via line 212). The sodium sulfate solution produced in reactor 210 should be at least 1% (and up to the saturation amount $Na_2SO_4$. Preferably, the concentration of sodium sulfate is in the range of about 5 to about 30% by weight and most preferably about 20 to about 30% by weight sodium sulfate. Additional $CO_2$ may be removed from the sodium sulfate solution in line 212 by drawing a vacuum thereon or by blowing air or steam therethrough. The sulfate solution is preferably somewhat acidic (that is, pH 4–7) so that the solution will be essentially free of $NaHCO_3$ (therefore no $CO_2$ bubbles will be formed in the water splitter). The sodium sulfate solution in line 212 may also be purified (by conventional means not shown) prior to being recycled through the acid compartments of the water splitter. In the acid compartment A, $Na^+$ ions are replaced by $H^+$ ions (formed at the cation face of bipolar membrane 204a) thereby generating a solution of $Na_2SO_4/H_2SO_4$. The sulfate/sulfuric acid solution is removed from acid compartment A via line 218 at least a portion thereof is supplied by line 216 to the reactor 210. As the ratio of $H_2SO_4$ to $Na_2SO_4$ is increased, the overall efficiency of the water splitting process is lowered; and thus, it is contemplated that the process illustrated in FIG. 2 may be conveniently accomplished by staging (not shown).

Figure 3:
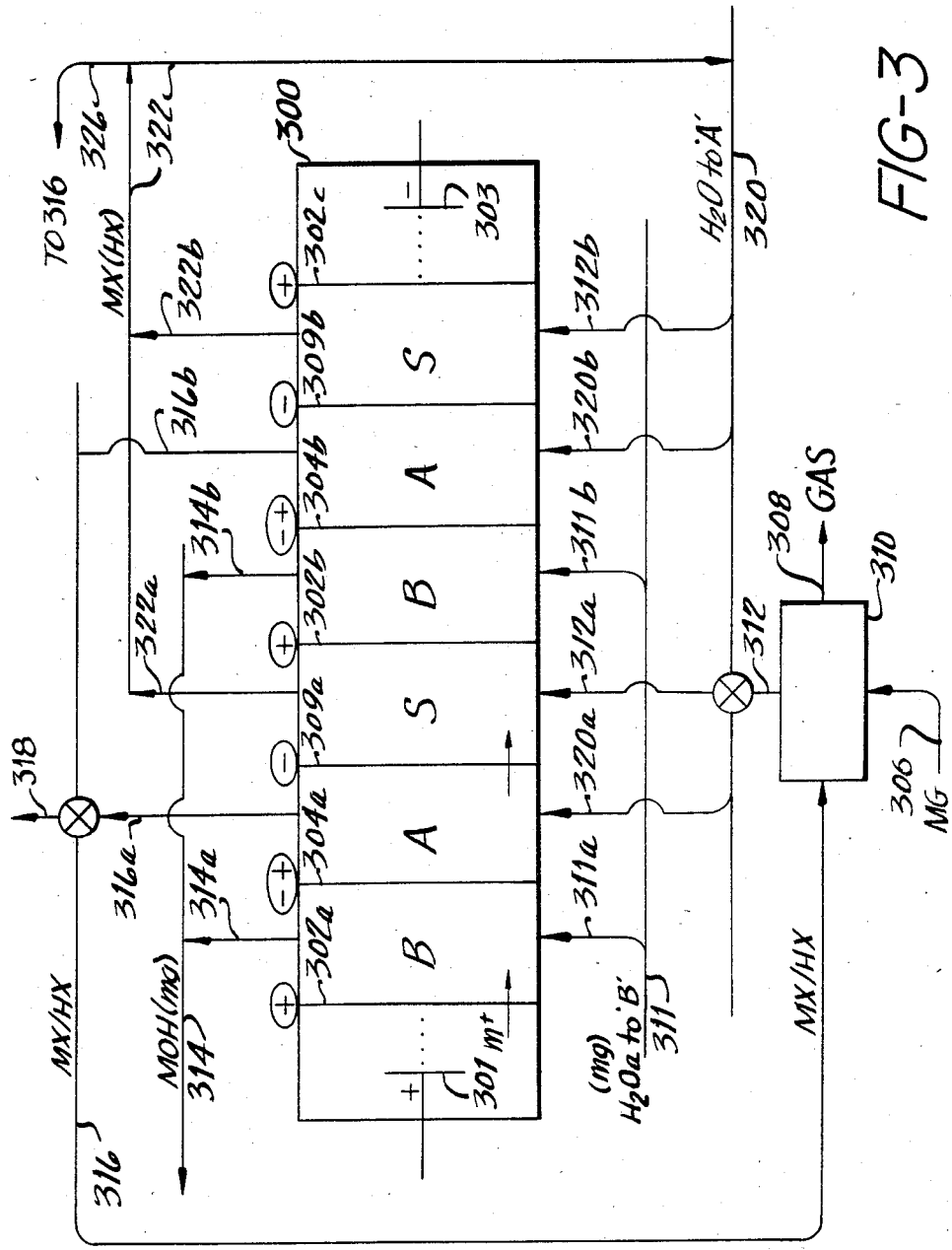
FIG. 3 illustrates schematically the operation of a preferred embodiment of the present invention in a three-compartment electrodialytic water splitter.

FIG. 3 schematically illustrates the operation of the process of the present invention practiced in a three-compartment electrodialytic water splitter 300 comprised of alternating cation exchange membranes 302a, 302b and 302c, bipolar mambranes 304a and 304b and anion exchange membranes 309a and 309b positioned between anode 301 and cathode 303. In a manner analogous to the process described with reference to FIG. 1, a salt MG (as a solid, an aqueous slurry or a solution) is added via line 306 to reactor 310. The MG reacts with acid HX, or a mixture of salt MX and acid HX, fed to 310 via line 316 to produce a gas G (removed via line 408) and form a salt MX (removed via line 312). The liberation of the gas G and the purification of the salt solution MX in line 312 is analogous to that described with reference to FIG. 1. At least a portion of the salt solution MX in line 312 is admitted via lines 312a and 312b to salt compartments S of a water splitter 300.

A portion of the salt solution MX in line 312 may also be admitted to the acid compartments A via lines 312, 320a and 320b under certain circumstances. If the acid HX that is generated in the acid compartments A is a strong acid such as HCl, there is normally little advantage in adding the salt MX to acid compartments A, except as a vehicle for picking up the acid HX and to limit the concentration thereof. If, however, the acid HX is a weak acid, for example acetic acid, the salt MX in line 312 may be admitted primarily to the acid compartments A to increase the conductivity of the weakly ionized solution. For acids of intermediate strength, for example $HSO_4^-$, the addition of salt MX to lines 320a and 320b will provide a buffering action thereby enabling the generation of a higher concentration of acid HX without as much drop-off in overall current efficiency as would occur for these intermediate strength acids in the absence of added salt.

At least a portion of the acidified solution withdrawn from acid compartments A via lines 316a and 316b and collected in (line 316 normally containing a mixture of salt MX and acid HX), is forwarded to the reactor 310, and the remainder may be removed for staging (not shown) via line 318. The liquid withdrawn from the salt compartments via lines 322a and 322b and collected in line 322 may be acidic, basic or neutral. When the solution in line 322 contains an acidified salt (that is, a mixture of MX and HX) at least a portion of the acidified salt solution in 322 is forwarded via line 326, combine with the acid solution in line 316, and supplied to reactor 310. Optionally, a portion of the salt solution in line 322 may be fed to line 320. The solution supplied to the base compartments B via line 310 311a and 311b may be water and, optionally, the salt MG. In base compartments B, hydroxide ions are added via the bipolar membranes 304a and 304b to form a solution of MOH (optionally containing MG) which is removed from the base compartments via lines 314a and 314b and collected in line 314 for further processing.

Figure 4:
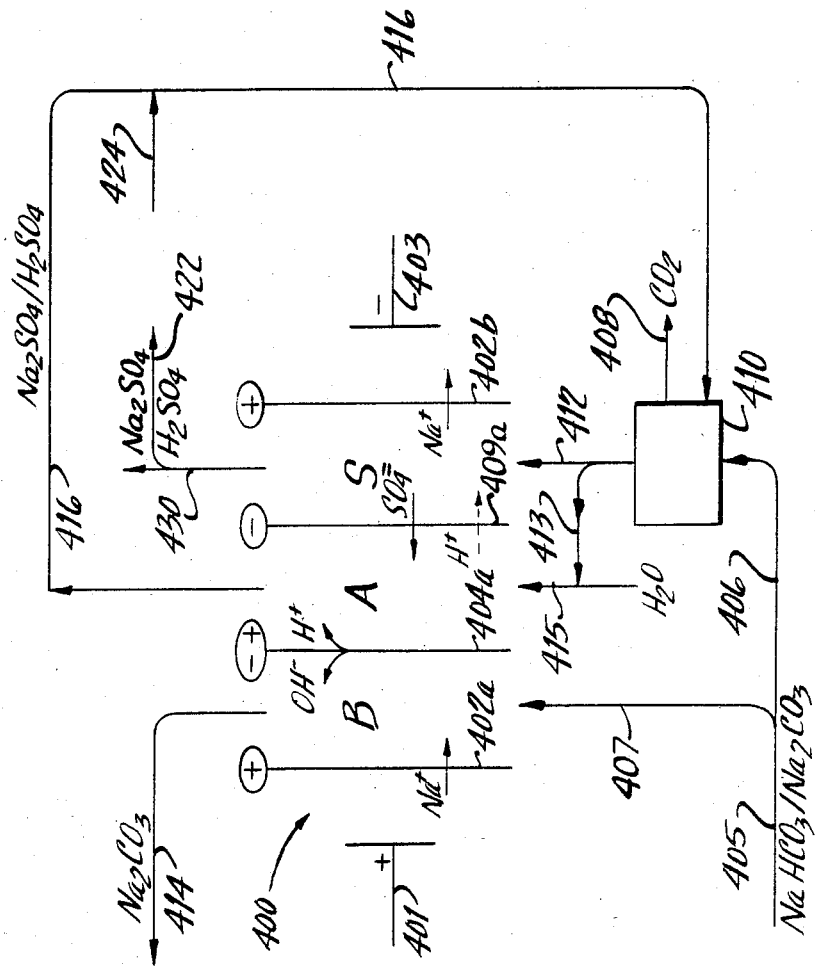
FIG. 4 illustrates schematically the ion transfer in a preferred embodiment of the process of the present invention operated in a three-compartment electrodialytic water splitter.

A preferred embodiment of the present invention practiced with a three-compartment water splitter for connecting trona to sodium carbonate and $CO_2$ is illustrated schematically in FIG. 4. The design of the three-compartment electrodialytic water splitter 400 of FIG. 4 is analogous to that described in reference to FIG. 3. An aqueous solution of $Na_2CO_3/NaHCO_3$ is fed via lines 405 and 406 to reactor 410. An aqueous solution of $Na_2SO_4/H_2SO_4$ is fed via line 416 to reactor 410 wherein the carbonate and bicarbonate values react with the acid solution to form carbon dioxide (removed via line 408) and an aqueous solution of $Na_2SO_4$ which is purified (not shown) and removed from 410 via line 412. At least a portion of the $Na_2SO_4$ in line 412 from reactor 410 is introduced into the salt compartments S of three-compartment water splitter 400. Water, optionally containing a portion of the $Na_2SO_4$ solution in line 412 from line 413 is introduced into the acid compartments A via line. Aqueous solution of $Na_2CO_3/NaHCO_3$ is supplied to the base compartment B.

The concentration of sodium sulfate introduced into the salt compartment S may range from about 3-5% by weight up to the saturation amount, and is preferably at least about 15% by weight sodium sulfate. During processing, sulfate ions are transported through anion membrane 409a from the salt compartment S through the acid compartment A wherein the sulfate ions combine with $H^+$ ions generated at the cation face of the bipolar membrane 404a to form aqueous sulfuric acid. Thus a depleted salt solution is produced in the salt compartment S and is removed via lines 420 and 422. The depleted salt solution may contain about 2 up to about 30% by weight sodium sulfate, and may be disposed of or recycled to another portion of the process. For example, the depleted salt solution is preferably combined with the output of the acid compartments A via line 424 (into line 416) for recycle to gas reactor 410 because the salt solution in the salt compartment S will frequently be acidic due to the imperfect selectivity of the anion membranes 409a. By combining the acidified salt solution with the acid compartment output we are able to recover as much of the acid values as possible.

The solution fed to the acid compartments A in line 415 may be water or a portion of the aqueous $Na_2SO_4$ removed from gas reactor 410. If the solution fed to the acid compartment A via line 415 is water, relatively pure sulfuric acid will be produced in the acid compartment A. The concentration of sulfuric acid produced when water is fed to the acid compartment A may range from about 1 to about 20% by weight. When commercially available anion exchange are employed with membranes, high sulfuric acid concentrations, e.g. approaching about 20% sulfuric acid, there will be a considerable amount of leakage of $H^+$ ions from the acid compartment A into the salt compartments S. Therefore, it is preferable to combine the outputs from the salt and the acid compartments whenever high sulfuric acid concentrations are produced in the acid compartment A. By adding sodium sulfate to the acid compartments, relatively less $H^+$ will be transferred to the salt compartment and higher concentrations of sulfuric acid will be produced in the acid compartments.

As recited above, a portion of the $NaHCO_3/Na_2CO_3$ solution in line 405 is forwarded by a line 407 to base compartment B. In base compartment B the sodium bicarbonate in solution is converted into sodium carbonate. The carbonate containing solution is removed from the base compartment B via line 414. The solution removed via line 414 may optionally contain sodium hydroxide. The solution may be forwarded to a dissolving tank (not shown) for reaction to produce more feed solution for trona and subsequent forwarding (after purification, not shown) to line 405.

The electrodialytic water splitters may be operated under a variety of conditions of temperature, current density and flow rates without departing from the scope of the present invention.

EXAMPLE 1

Two-compartment Water Splitting Test with External Acidification to Liberate $CO_2$ A 181 day test at a current density of 107 ma/cm$^2$ was carried out using a purified trona-derived solution in a two-compartment water splitter stack containing nine unit cells, each having 1 dm$^2$ active area. The stack consisted of a platinum anode, an anolyte compartment, nine unit cells, each unit cell having a Nafion ® 110 strongly acidic cation permselective membrane and a bipolar membrane prepared as described in U.S. Pat. No. 4,116,889 thereby forming alternating base and acid compartments, a catholyte compartment, and a platinum cathode. A 0.5 M $Na_2SO_4$ solution was fed from a tank to the analyte and catholyte compartments. The acid circulation loop contained 10 weight percent $Na_2SO_4$ and 4 weight percent $NaHSO_4$, and the base circulation loop contained 20 weight percent $Na_2CO_3$ and 4 wt % $Na_2SO_4$. The overflow from the acid and base recycle tank was fed into a feed tank to from a solution of 20 wt % $Na_2SO_4$ and 1 wt % $NaHSO_4$. During the mixing process, $CO_2$ was liberated in the feed tank and was vented into the base tank to combine therein with the NaOH generated in the base loop. Make-up $CO_2$ was added to the base tank from a high pressure $CO_2$ cylinder. The acid and base solutions were derived from dissolution of trona (crude sodium sesquicarbonate) in hot water. After purification to remove insolubles, the trona solution was cooled to room temperature and $NaHCO_3$ crystallized out. The mother liquor, after filtration of $NaHCO_3$, was rich in $Na_2CO_3$ and was used in the base recycle loop. The recovered solid $NaHCO_3$ was acidified with sulfuric acid to evolve $CO_2$ and to form a $Na_2SO_4$ solution which was used in the acid recirculation tank and the feed tank at the beginning of the test. Periodically, the solutions in the three tanks were replaced with fresh trona-derived solutions so as to provide ready comparison of performance over the 181 day test period.

During the 181 day test, the overall cell voltage remained essentially constant at 19 volts at 35° C. Upon disassembly of the stack at the conclusion of the test, the bipolar membranes were in excellent physical and mechanical condition. The potential drop across the bipolar membranes had increased only 0.1 to 0.15 volts (total increase over test) during the extended 181 day test. External acidification to liberate gases outside the acid compartment has a beneficial effect on the bipolar membrane stability.

EXAMPLE 2

Attempted Two-compartment Water Splitting Test With Internal Acidification and Liberation of $CO_2$ The electrodialytic stack of Example 1 was used. A current density of 107 ma/cm was used. The solution fed to the acid compartments was a saturated (about 10-12 wt % $NaHCO_3$. The solution fed to the base compartment was a purified trona-derived mother liquor containing 6 wt % $NaHCO_3$ and 16 wt % of $Na_2CO_3$. Bubbles of $CO_2$ gas almost immediately filled the acid compartment. The voltage drop increased to 25 volts almost immediately and the current density decreased <70 ma/cm². Stable operation could not be maintained so the test was stopped.

We claim:

1. A process which comprises the steps of:
    contacting a material comprising a salt of a first acid with a hydrogen ion-enriched aqueous solution comprising a second acid to produce a product solution comprising the first acid and a salt of the second acid, and being substantially free of the salt of the first acid;
    feeding at least a portion of the product solution to an electrodialytic water splitter and generating therein the hydrogen ion-enriched aqueous solution comprising the second acid;
    withdrawing the hydrogen ion-enriched aqueous solution comprising the second acid from the electrodialytic water splitter; and,
    supplying at least portion thereof for contact with material comprising the salt of the first acid.

2. The process of claim 1 wherein the electrodialytic water splitter comprises a unit cell, the unit cell comprising a base compartment and an acid compartment.

3. The process of claim 2 wherein the unit cell further comprises a salt compartment.

4. The process of claim 3 further comprising the step of feeding a portion of the product solution to the salt compartment.

5. The process of claim 4 further comprising the step withdrawing an aqueous solution from the salt compartment and forwarding a portion thereof for contact with material comprising the salt of the first acid.

6. The process of claim 3 wherein the base compartment, acid compartment and salt compartment of the unit cell are defined by cation membranes, means for splitting water into hydroxyl ions and hydrogen ions, and anion membranes.

7. The process of claim 6 wherein said means for splitting water into hydroxyl ions and hydrogen ions is a bipolar membrane.

8. The process of claim 2 wherein at least a portion of the product solution is fed to the acid compartment of the unit cell.

9. The process of claim 8 wherein salt of the first acid is fed to the base compartment.

10. The process of claim 9 further comprising the step of feeding water to the acid compartment.

11. The process of claim 10 further comprising the step of feeding a portion of the product solution to the salt compartment.

12. The process of claim 10 further comprising the step of feeding product solution to the acid compartment.

13. The process of claim 2 wherein a solution comprising water is fed to the base compartment of the unit cell.

14. The process of claim 2 wherein the acid and base compartment of said unit cell are defined by cation membranes and means for splitting water into hydrogen ions and hydroxyl ions.

15. The process of claim 14 wherein said means for splitting water into hydrogen ions and hydroxyl ions is a bipolar membrane.

16. The process of claim 1 wherein the material comprising a salt of a first acid comprises at least one of; solids recovered from dry scrubbing a $SO_2$-containing gas with a basic sodium-containing material; solids recovered from spray-dry absorption of a $SO_2$-containing gas with a basic sodium containing material; ore containing $NaHCO_3$, $Na_2CO_3$ or mixtures thereof; and an aqueous solution recovered from wet scrubbing of a $SO_2$-containing gas with a basic sodium-containing material.

17. The process of claim 1 wherein contact of the material with the salt of the first acid occurs under conditions of time, temperature, and pressure sufficient to remove substantially all of the gas capable of being liberated from the the salt of the first acid.

18. The process of claim 1 wherein the salt of the first acid is selected from the group consisting of salts of at least one member of Group Ia, IIa, and $NH_4^+$, with at least one member of $HCO_3^-$, $CO_3^-$, $HS^-$, $S^-$, $NO_2^-$, $HSO_3^-$ and $HSO_3^-$.

19. The process of claim 18 wherein the salt is an alkali metal salt.

20. The process of claim 1 wherein the second acid of said aqueous hydrogen ion-enriched solution is selected from a group consisting of $H_2SO_4$, $HSO_4^-$, $H_3PO_4^-$, $H_2PO_4^-$, $HPO_4^=$, $HCl$, $H_2F_2$, $HF_2^-$, $HO_2CCH=CH-CO_2H$, $HO_2CH=CHCO_2^-$, $(CO_2H)_2$, $(CO_2^-)CO_2H$, $CH_2(CO_2H)_2$, $HOC(CH_2CO_2H)_2CO_2H$, $HOC(CH_2CO_2H)_2CO_2^-$, $HOC(CH_2CO_2H)(CH_2CO_2)(CO_2^-)$, $(HOCHCO_2H)_2$, $HO_2CCH(OH)CO_2^-$, and $HO_2CR$ wherein R is H, $CH_3$, $C_2H_5$, $CCl_2H$, $CCl_3$, $CH(OH)CH_3$, $CF_2H$ or $CF_3$.

* * * * *